(12) United States Patent
Mayr et al.

(10) Patent No.: US 6,299,824 B1
(45) Date of Patent: Oct. 9, 2001

(54) PROCESS AND ARRANGEMENT FOR MANUFACTURING BRUSH-TYPE SEALS

(75) Inventors: Alfred Mayr, Rochrmoos; Dieter Hagg, Karlsfeld, both of (DE)

(73) Assignee: MTU Motoren- und Turbinen-Union Muenchen GmbH, Munich (DE)

( * ) Notice: Subject to any disclaimer, the term of this patent is extended or adjusted under 35 U.S.C. 154(b) by 0 days.

(21) Appl. No.: 09/628,298

(22) Filed: Jul. 28, 2000

Related U.S. Application Data

(62) Division of application No. 09/091,010, filed as application No. PCT/EP97/05259 on Sep. 25, 1997, now Pat. No. 6,120,622.

(30) Foreign Application Priority Data

Oct. 8, 1996 (DE) .............................................. 196 41 375

(51) Int. Cl.[7] ...................................................... C21D 1/06
(52) U.S. Cl. .............................. 266/87; 266/252; 266/259
(58) Field of Search .......................... 148/516; 29/888.3; 277/355; 266/87, 249, 252, 259

(56) References Cited

U.S. PATENT DOCUMENTS

| 4,202,554 | * | 5/1980 | Snell ....................................... 277/53 |
| 4,267,476 | * | 5/1981 | Lee ........................................ 310/251 |
| 4,730,876 | * | 3/1988 | Werner et al. ............................ 300/2 |
| 4,809,990 | * | 3/1989 | Merz ....................................... 501/88 |
| 4,839,997 | * | 6/1989 | Pritchard ................................ 51/290 |
| 4,858,304 | * | 8/1989 | Weldon et al. ......................... 29/598 |
| 5,165,758 | | 11/1992 | Howe . |
| 5,183,197 | | 2/1993 | Howe . |
| 5,732,466 | * | 3/1998 | Bouchard ............................. 29/888.3 |
| 6,062,463 | * | 5/2000 | Hoffmueller et al. .............. 29/888.3 |
| 6,120,622 | * | 9/2000 | Mayr et al. ........................... 148/516 |

FOREIGN PATENT DOCUMENTS

| 0 211 275 | 2/1987 | (EP) . |
| 0 213 341 | 3/1987 | (EP) . |
| 2 021 210 | 11/1979 | (GB) . |
| WO 96/16287 | 5/1996 | (WO) . |

* cited by examiner

*Primary Examiner*—Scott Kastler
(74) *Attorney, Agent, or Firm*—Crowell & Moring LLP

(57) ABSTRACT

A process and arrangement for manufacturing brush-type seals having inclined bristles provides at least one ring-shaped brush-type seal having radially extending bristles of a length which, by way of the inclining of the bristles with respect to the radii of the ring-shaped brush-type seal leads at least essentially to the desired brush diameter; positions the at least one brush-type seal and at least one heatable annealing wall of an annealing device relative to one another so that the free bristle ends, while the bristles are bent, rest against the annealing wall, and simultaneously or subsequently rotating the at least one brush-type seal and at least the heatable annealing wall relative to one another until the bristles are inclined with respect to the radii of the ring-shaped brush-type seal in its ring plane by a definable angle; heats the annealing wall to a definable temperature; maintains the temperature of the heated annealing wall for a definable time period; and removes the at least one brush-type seal from the annealing device.

12 Claims, 5 Drawing Sheets

PROCESS AND ARRANGEMENT FOR MANUFACTURING BRUSH-TYPE SEALS

This application is a division of application Ser. No. 09/091,010, filed Jun. 8, 1998, now U.S. Pat. No. 6,120,622. Which is a 371 of PCT/EP97/05259 filed on Sep. 25,1997.

BACKGROUND AND SUMMARY OF THE INVENTION

The invention relates to a process for manufacturing brush-type seals, for example, particularly brush-type metal seals. Furthermore, the invention relates to an arrangement for manufacturing such brush-type seals.

In the manufacture of brush-type seals, particularly those made of metal having inclined bristles, their inclination must be caused and the brushes must be densified or packed. In the manufacturing processes currently used in practice, this is achieved by means of two annealing processes. The first annealing process is used for placing the metal bristles in a sloped position; and the second process has the purpose of densifying the rounded brush which will then be ground at the inside diameter.

Thus a process for manufacturing a brush-type seal is known from European Patent Document EP 0 211 275 B1 whose bristles are fastened in a mounting preferably constructed as a holding ring. For this purpose, in a step A), a thread consisting of bristle material is first wound by way of two elongated spindles, which are spaced in parallel from one another, to form a dense thread stack which has an approximately oval cross-section. Then, in a step B), the thread seal is gripped on the two spindles by the fitting-on of clamping strips at the crowns. In a step C), the thread seal is severed by a cut in parallel to the spindles so that two mutually opposite, straight, semifinished brushes are created which are preferably equipped with bristles having the same length. Finally, in a step D), these semifinished brushes are bent to the desired brush contour, particularly to a circular arc contour, and are joined to form a closed ring.

For achieving an inclination of the bristles in their mounting, before process step B), the spindles which are wound with the thread seal are offset with respect to one another in the longitudinal direction. In this connection, when, for example, metal bristles are used, it is known to a person who is skilled in the art to carry out a recrystallization annealing for conserving the inclination of these metal bristles. This first annealing step before the severing of the thread seal for producing semifinished brushes is carried out as a function of the material, for example, at 720° C.

After step D), if metal bristles are used in practice, a second annealing step is required for compacting the brushes produced so far and adjusting their axial dimensional accuracy.

This state of the art basically already requires high expenditures because two separate annealing steps must be carried out. In addition, particularly the resetting of the wound thread seal to an annealing device, which is required for the first annealing step, is complicated, cumbersome and requires high mechanical expenditures.

It is an object of the present invention to simplify the manufacturing process for brush-type metal seals.

This object is achieved by a manufacturing process for brush-type seals characterized by a) providing at least one ring-shaped brush-type seal having radially extending bristles of a length which, by way of the inclining of the bristles with respect to the radii of the ring-shaped brush-type seal leads at least essentially to the endeavored brush diameter; b) 1) positioning the at least one brush-type seal and at least one heatable annealing wall of an annealing device relative to one another so that the free bristle ends, while the bristles are bent, rest against the annealing wall; 2) rotating the at least one brush-type seal and at least the heatable annealing wall relative to one another until the bristles are inclined with respect to the radii of the ring-shaped brush-type seal in its ring plane by a definable angle; c) heating the annealing wall to a definable temperature; d) maintaining the temperature of the heated annealing wall for a definable time period; and e) removing of the at least one brush-type seal from the annealing device.

A brush-type seal having a brush is therefore produced first without any inclination of the wires or bristles in the future running direction with superimposed bristle shafts in a conventional manner machined to the finished size, in which case, however, no annealing treatments are carried out. During or after the mounting of the brush-type seal on a new type of annealing device, the endeavored radial setting is adjusted by a rotation to, for example, 45°. Since the process according to the invention has the advantage that several brush-type seals can be treated simultaneously, as will be indicated later in connection with a preferred further development, for example, a spacer ring can now be mounted on the bristle stack of the already mounted or adjusted brush-type seal.

According to the above-mentioned further development, the mounting of another 2 to 20 brush-type seals, for example, can now take place according to the previous process steps. Finally, a clamping lid will be mounted which holds the stacked brush-type seals together.

By means of the bristles of the bristle-type seals inclined in the endeavored manner, the recrystallization annealing is now carried out, for example, at 780° C. for 60 minutes, before the brush-type seals are removed from the annealing device after the cooling of the annealing device.

With the aid of the new annealing process, the inclination of the bristles and of the inside diameters of the brush can be established in one operation. This completely eliminates the two annealing processes carried out in the state of the art during the prefabrication, as well as the high-expenditure annealing devices required for this purpose. The processes are replaced by a new type of annealing process of the otherwise finished brush-type seal. The separate grinding of the inside diameter of the brush-type seal is also no longer absolutely necessary.

In the case of the process according to the invention for manufacturing brush-type seals with inclined bristles, it is also preferably provided that step b)2) is carried out simultaneously with step b)1). This minimizes the set-up time of the at least one brush-type seal with correctly inclined bristles in the annealing device. In addition, the combined rotational adjustment results in a particularly effective and no-disturbance setting up of the brush-type seal with correctly inclined bristles in the annealing device.

However, as an alternative to the above-mentioned further development, particularly as a function of the annealing wall, it can also be provided that step b)2) is carried out after the positioning of the at least one brush-type seal and of the heatable annealing wall of the annealing device relative to one another was completely concluded in step b)1).

Preferred inclinations of the bristles of the brush-type seal are such that, in step b)2, the bristles are inclined with respect to the radii of the ring-shaped brush-type seal in their plane by an angle of between approximately 15° to approximately 75°, particularly between approximately 30° to approximately 60°, and preferably approximately 45°.

As a function of the material of the bristles, such as the metal bristles, it is preferred for the heatable annealing wall to be heated up in step c) to a temperature of between approximately 500° C. and approximately 1,000° C., particularly between approximately 700° C. and approximately 800° C., and preferably between approximately 720° C. and approximately 780° C., and/or for the temperature of the head annealing wall reached in step c) to be maintained in step d) for a time period of approximately 30 min. to approximately 90 min., particularly approximately 45 min. to approximately 75 min. and preferably approximately 60 min.

According to another further development of the invention, a plurality of brush-type metal seals, for example, are aligned with one another and are simultaneously machined jointly. This possibility has been mentioned above. In particular, the new annealing process can be carried out for up to then, twenty, but also more brushes simultaneously on one arrangement. For this purpose, it is provided according to the invention that, before step c) of the heating of the annealing wall, a plurality of brush-type seals provided according to step a) and the heatable annealing wall of the annealing device according to step b)1) are positioned relative to one another and according to step b)2) simultaneously or subsequently, these brush-type seals and at least the heatable annealing wall are rotated relative to one another until the bristles are inclined by a definable angle with respect to the radii of the ring-shaped brush-type seal in its ring plane.

Another solution of the objective on which the invention is based consists of a manufacturing arrangement for ring-shaped brush-type seals, such as brush-type metal seals.

By means of the new annealing arrangement, the inclination of the bristles and of the inside diameters of the brush can be produced in one operation. In comparison with respect to the state of the art, this eliminates an annealing process as well as the high-expenditure annealing device required for this purpose. The separate grinding of the inside diameter of the brush-type seal is also no longer absolutely necessary.

According to a preferred further development of the arrangement according to the invention, the heatable annealing wall is the exterior wall of an annealing arbor onto which the at least one ring-shaped brush-type seal can be fitted. This embodiment is particularly adapted to the treatment of brush-type seals having inwardly directed bristles and is therefore advantageously suited for it.

In a preferred further development of the above-mentioned embodiment of the invention, it is provided that the annealing arbor is essentially cylindrical and, in its free end area designed for fitting on the at least one ring-shaped brush-type seal and situated opposite its mounting end in the annealing device, has a conical expansion cone. The outside diameter of this expansion cone increases from the free end of the annealing arbor in the direction of its mounting end in the annealing device, the maximal outside diameter of the annealing arbor corresponding at least essentially to the inside diameter of the ring-shaped brush-type seal with the inclined bristles which is to be completed. This further development of the annealing arbor advantageously, on the one hand, facilitates the placing of the brush-type seal on the annealing arbor and, on the other hand, the inclining of its bristles.

The handling of the brush-type seal, in particular during the fitting on the annealing arbor, is particularly simple and secure if the annealing device contains a holding device for mounting the at least one brush-type seal.

This can advantageously be further developed such that the holding device, for receiving a plurality of axially mutually aligned brush-type seals, contains spacer parts, such as spacer rings, which can be inserted between the latter and which ensure a secure and exact holding of the individual brush-type seals as well as an inclining of their bristles.

In order to be able to carry out the adjusting of the at least one brush-type seal and of the heatable annealing wall of the annealing device in a precise manner, it is preferred for the annealing device to contain, in particular, controllable driving devices which are designed for the adjusting of the at least one brush-type seal and of the heatable annealing wall of the annealing device relative to one another in order to position the at least one brush-type seal and the heatable annealing wall of the annealing device relative to one another and/or in order to rotate the at least one brush-type seal and at least the heatable annealing wall relative to one another until the bristles are inclined with respect to the radii of the ring-shaped brush-type seal in their plane by a definable angle. A further development thereof provides that the driving devices are designed, in particular, for adjusting the heatable annealing wall as well as preferably for an adjustment with a constant advance and/or a constant rotational speed.

In order to be able to bring the heatable annealing wall of the annealing device to a desired temperature, preferably, in particular, controllable heating devices are provided by which at least the heatable annealing wall of the annealing device can be heated to a temperature between approximately 500° C. and approximately 1,000° C., particularly between approximately 700° C. and approximately 800° C., and preferably between approximately 720° C. and approximately 780° C.

The arrangement will then represent a particularly precise and simple handling and machining of the at least one brush-type seal if the annealing device contains a control which controls the heating of the heatable annealing wall and the maintaining of the desired temperature in this case for a time period of approximately 30 minutes to approximately 90 minutes, particularly approximately 45 minutes to approximately 75 minutes and preferably approximately 60 minutes. The control preferably also controls a cooling operation of the heatable annealing wall of the annealing device.

In order to be able to possibly remove undesirable deformations or excessive lengths of the annealed bristles, it is advantageous to provide finishing devices for the finishing of the functional diameter of the brush of the at least one brush-type seal after the annealing treatment, which takes place corresponding to another further development of the invention.

If, in another embodiment of the arrangement, a protection against torsion is used, which holds the at least one brush-type seal relative to the annealing device in its position with inclined bristles, it is ensured that no automatic adjusting of the brush-type seal takes place during the annealing operation. In this case, the torsion protection device can, on one side, be applied to the annealing device or the at least one brush-type seal or optionally particularly to the holding device and, on the other side, to the at least one brush-type seal or to the annealing device.

Additional advantageous and preferred embodiments of the invention are described herein.

For illustrating embodiments, the invention will be described in detail in the following with reference to the drawing.

DETAILED DESCRIPTION OF THE DRAWINGS

Figure 1:
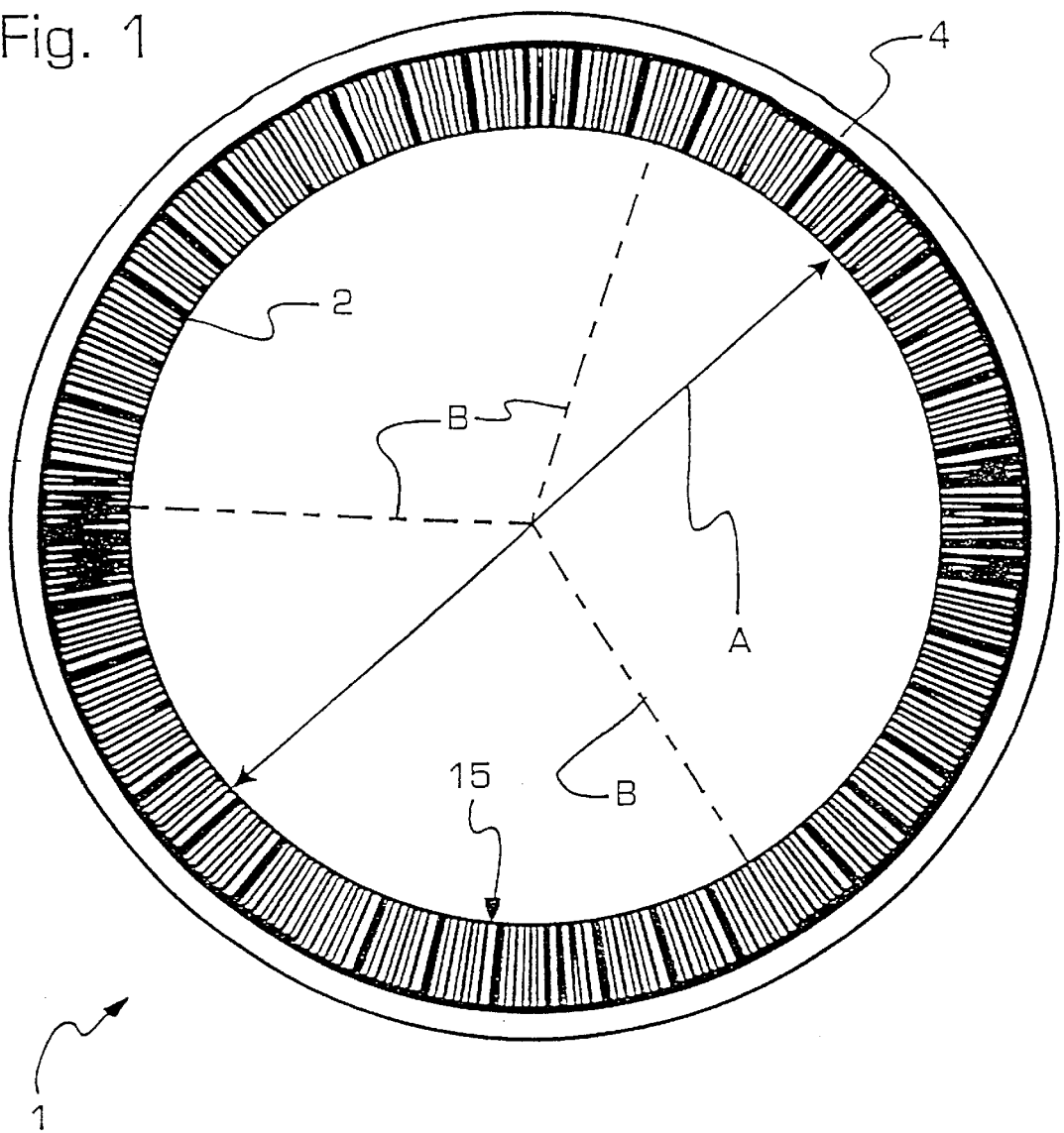
FIG. 1 is a top view of an embodiment of a brush-type seal having radially extending bristles of a length which, as the result of the inclination of the bristles with respect to the radii of the ring-shaped brush-type seal, leads at least essentially to a desired brush diameter.
Figure 2:
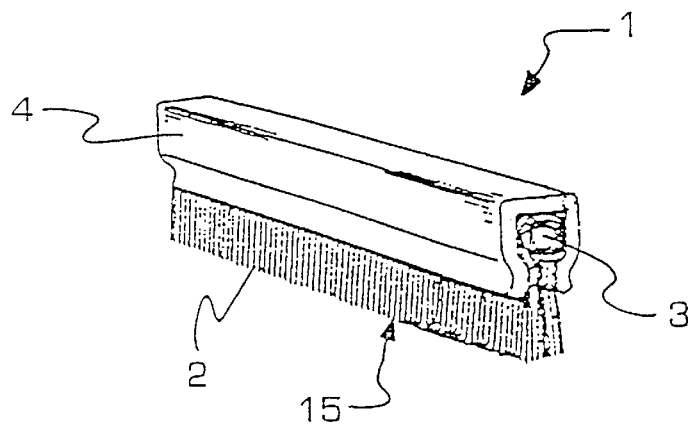
FIG. 2 is a perspective view of a portion of the brush-type seal illustrated in FIG. 1.

FIGS. 1 and 2 illustrate a brush-type seal 1 in a top view and a portion thereof in a perspective view, to the extent that it is finished with the exception of the inclining of its bristles 2. In this condition of the brush-type seal 1, it contains a ring-shaped core 3 which carries the bristles 2 and to which the latter are fastened by means of a clamping strip 4.

The bristles 2 leave a diameter A of the brush-type seal 1 open and therefore have such a length that, after the inclining about a desired angle a (see FIG. 3) with respect to the assigned radii B of the ring shape of the core 3, they leave open at least essentially a defined inside diameter C (see FIG. 3) of the brush-type seal 1. The bristles 2 are fastened to the core 3 of the brush-type seal 1, for example, by means of a clamp 4.

This inside diameter C corresponds at least approximately to the outside diameter, for example, of a shaft 5 (see FIG. 5) which is surrounded by the brush-type seal 1 when in use. The inclination of its bristles 2, which is intended to originate from the condition of the brush-type seal 1 illustrated in FIGS. 1 and 2, is to take place in the running direction of such a shaft 5 indicated by the arrow D, for the purpose of which the brush-type seal 1 is mounted on a gearing housing 6 of the shaft 5, as schematically illustrated in FIG. 5.

Figure 3:
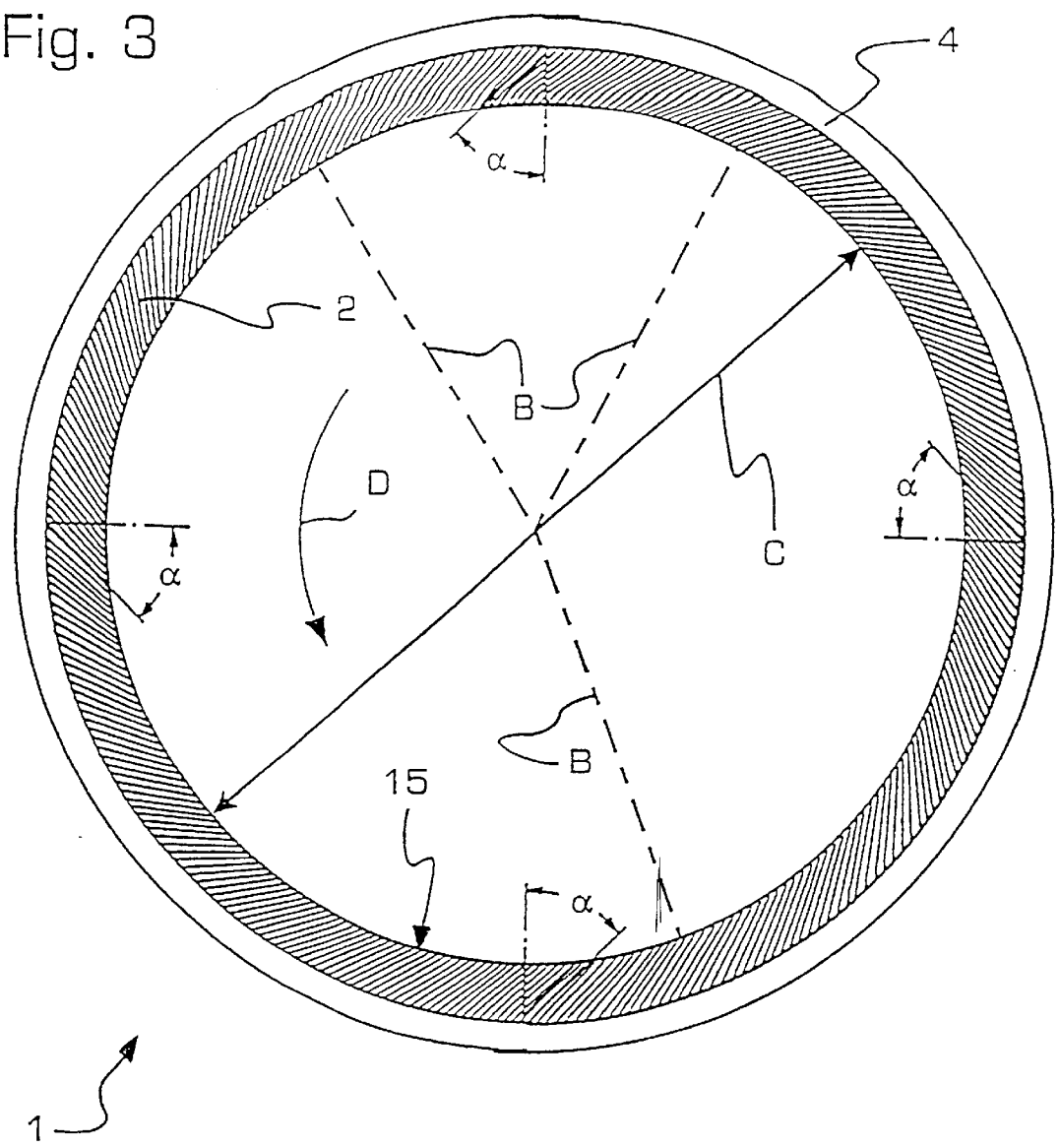
FIG. 3 is a top view of another embodiment of the brush-type seal illustrated in FIG. 1, however, with the bristles in the inclined condition, as can be produced by the process of the invention and by the arrangement for manufacturing brush-type seals with inclined bristles according to the invention.
Figure 4:
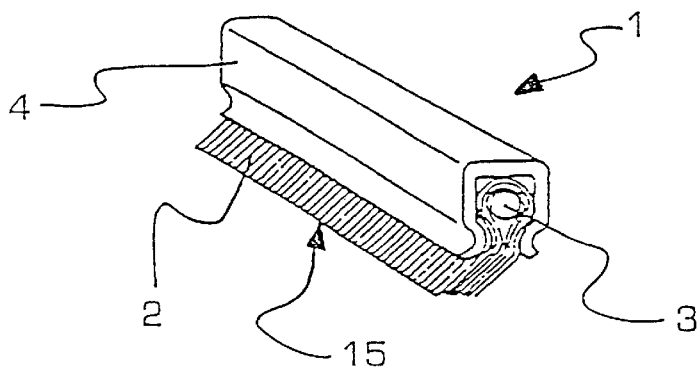
FIG. 4 is a perspective view of a portion of the brush-type seal illustrated in FIG. 3.

The desired final condition of the bristles 2 of the brush-type seal 1 for sealing off the shaft 5 (see FIG. 5) is illustrated in its top view in FIG. 3 and in its perspective partial view in FIG. 4. The angle a, at which the bristles 2 now extend to the radii B of the ring shape of the brush-type seal 1, has the result that the inside diameter C is set which is required for the final use of the brush-type seal 1 on the shaft 5.

Figures 5, 6:
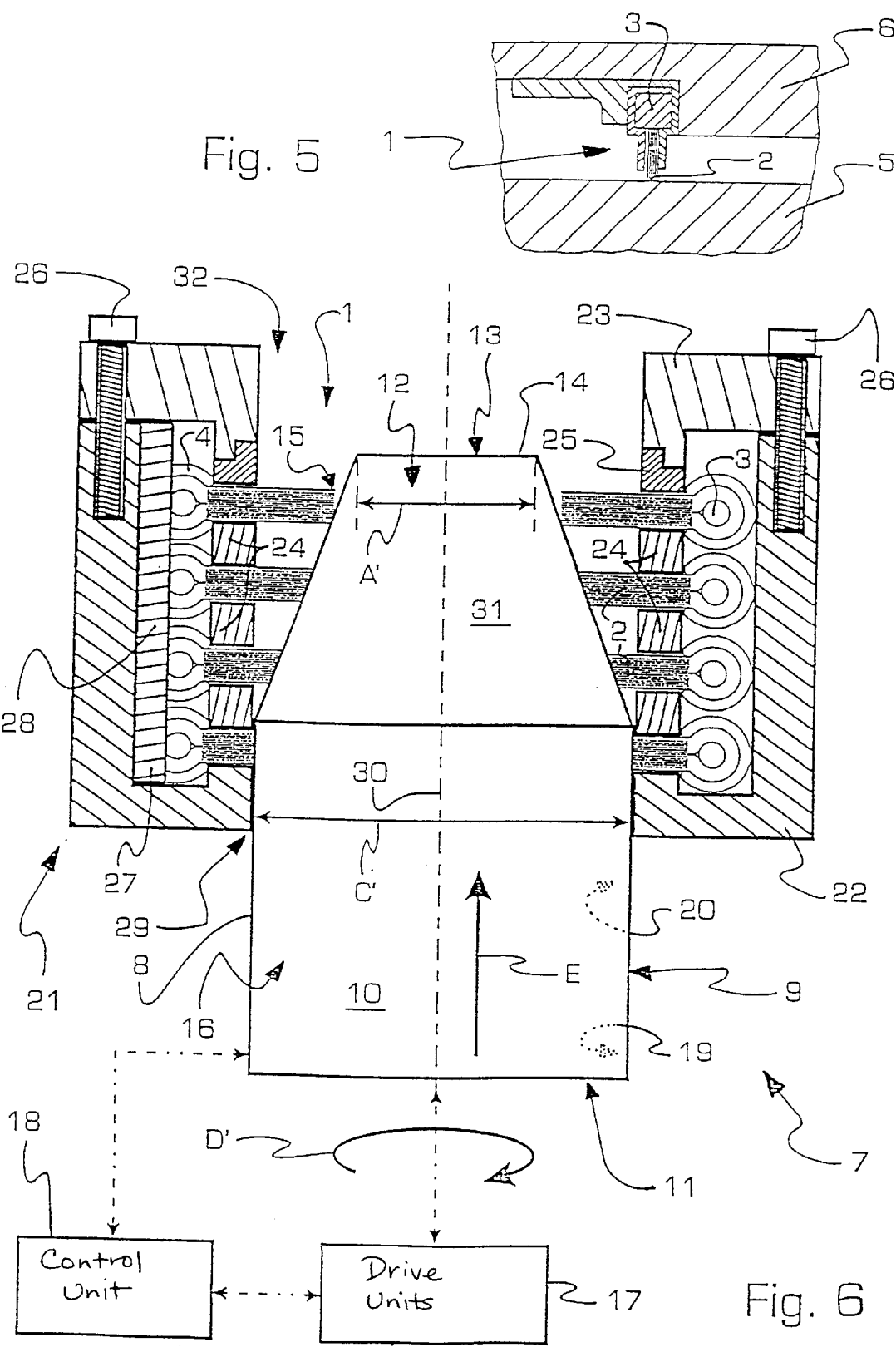
FIG. 5 is a schematic cross-sectional view of a brush-type seal mounted on a rotatable shaft.
FIG. 6 is a schematic cross-sectional view of an embodiment of an arrangement for manufacturing brush-type seals with inclined bristles.
Figure 7:
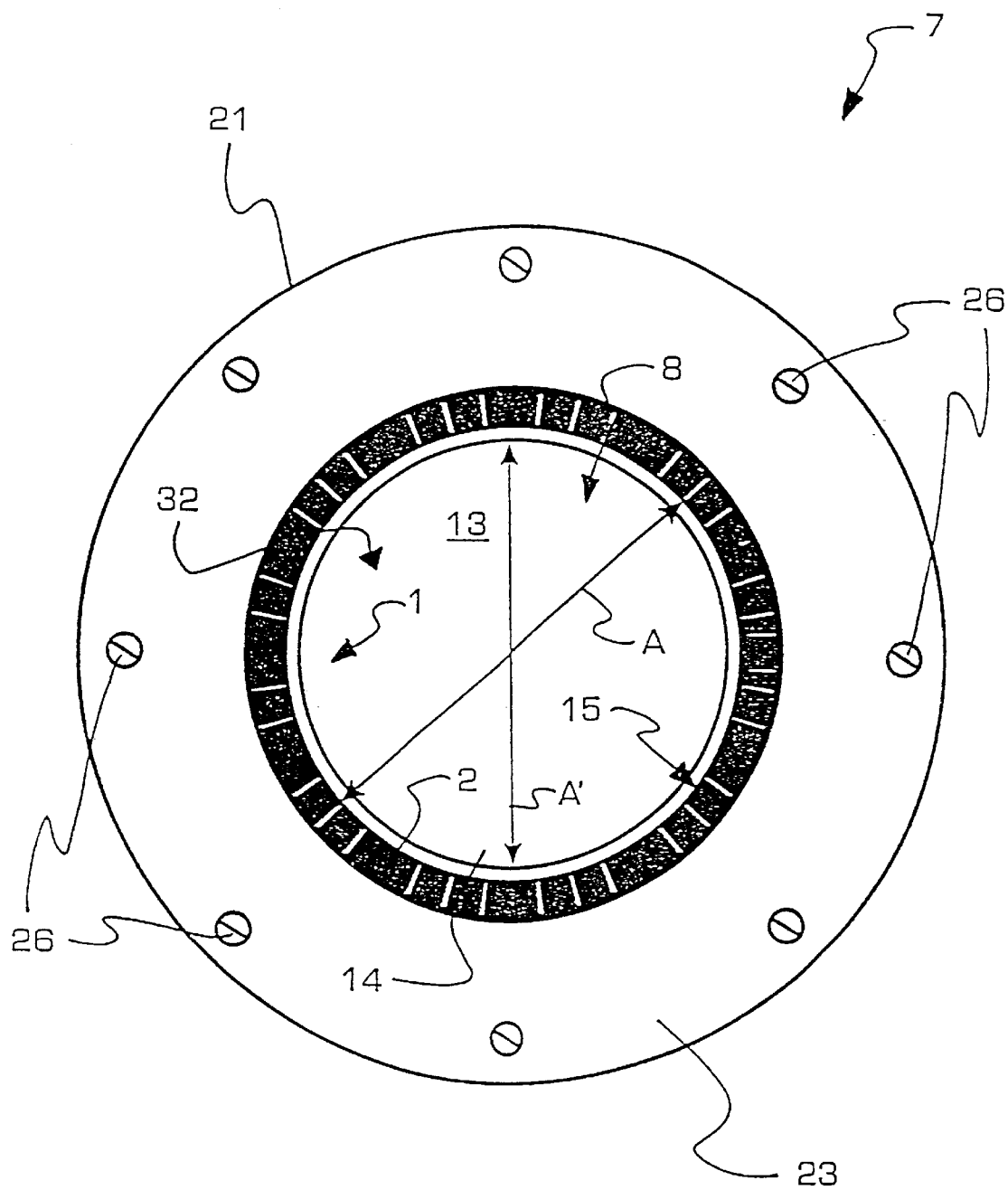
FIG. 7 is a schematic top view of the arrangement illustrated in FIG. 6 for manufacturing brush-type seals with inclined bristles before the guiding-together with the brush-type seal illustrated in FIG. 1.
Figure 8:
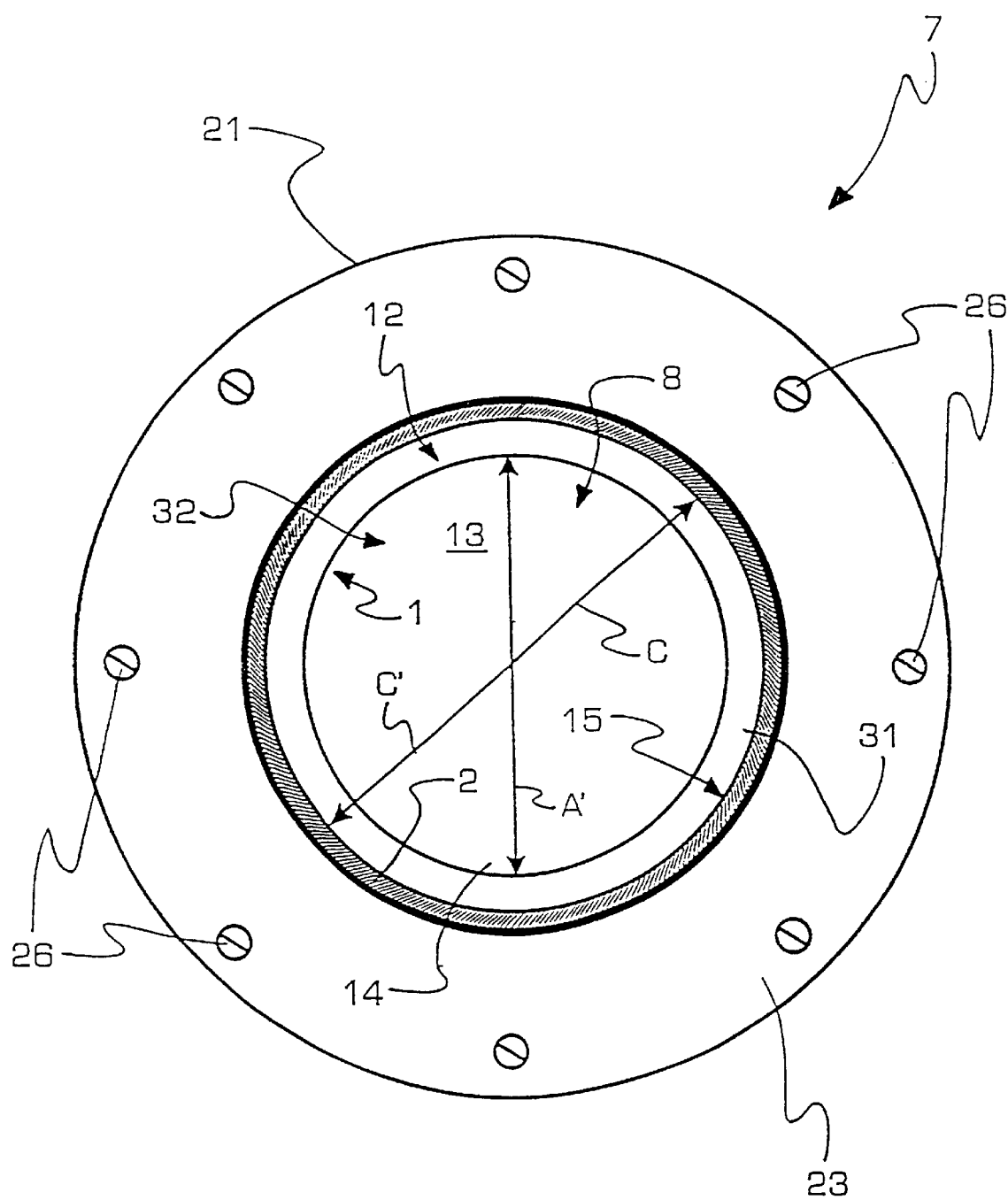
FIG. 8 is a schematic top view of the arrangement illustrated in FIG. 6 for manufacturing brush-type seals with inclined bristles after the guiding-together with the brush-type seal illustrated in FIG. 1 and the relative rotation between the latter and the annealing device.

FIGS. 6 to 8 include a cross-sectional view and two top views of an annealing device 7 by which the brush-type seal 1 can be brought from the condition illustrated in FIGS. 1 and 2 into that illustrated in FIGS. 3 and 4.

The annealing device 7 is a component of an arrangement for manufacturing ring-shaped brush-type seals 1 with inclined bristles 2 and is equipped with devices for carrying out a heat treatment of the bristles 2. For this purpose, the annealing device 7 contains an annealing arbor 8 whose outer circumferential surface 9 forms a heatable annealing wall 10.

The annealing arbor 8 is essentially cylindrical and has a conical expansion cone 13 on its free end area 12, which is designed such that at least one ring-shaped brush-type seal 1 can be fitted on it. The expansion cone 13 is situated opposite the arbor's mounting end 11 in the annealing device 7. The outside diameter of the expansion cone 13 increases from the free end 14 of the annealing arbor 8 in the direction of its mounting end 11 of the annealing device 7. The maximal outside diameter C' of the annealing arbor 8 corresponds at least essentially to the inside diameter C of the ring-shaped brush-type seal 1 with the inclined bristles 2 to be completed. The minimal outside diameter A' of the expansion cone 13 of the annealing arbor 8 on its free end 14 is at least slightly smaller than the inside diameter A; that is, the free diameter between the inside ends 15 of the radially extending bristles 2 of the ring-shaped brush-type seal 1. The individual diameters are particularly well illustrated in FIGS. 7 and 8.

For simplifying the manufacturing, mounting, servicing and operation of the annealing device 7 and of the annealing arbor 8, the latter is formed of two parts, specifically the expansion cone 13 and an annealing cylinder 16. During the operation of the annealing device 7, it is, for example, sufficient to bring the annealing cylinder 16 to the required temperature for the recrystallization annealing of the bristles 2. For reasons of completeness, it is also indicated that the mounting end 11 of the annealing arbor 8 is formed by the end of the annealing cylinder 16 facing away from the expansion cone 13.

By means of its mounting end 11, the annealing arbor 8 is connected to driving devices 17 which are housed in a housing (not shown) of the annealing device 7. The driving devices 17 are designed for axially adjusting as well as rotating the annealing arbor 8. The selection of driving devices which are suitable for this purpose can be left up to the person skilled in the art so that a detailed description of the driving devices is not required. Care should only be taken that the coupling of the driving devices 17 with the annealing arbor 8 be designed such that the driving devices 17 are not damaged by the high temperature of the annealing arbor 8 or its outer circumferential surface 9 acting as the annealing wall 10.

In order to operate the driving devices 17 and coordinate their adjusting possibilities, a control unit 18 is also provided. The latter also controls a heating of the annealing arbor 7 or of its annealing wall 8, keeping the temperature of the arbor 7 or the wall 8 constant in the heated condition, as well as the cooling. For heating and for keeping the temperature of the annealing arbor 7 or its annealing wall 8 constant, suitable heating devices 19 as well as temperature monitoring devices 20 are provided.

The annealing device 7 also contains a holding device 21 for receiving a plurality of brush-type seals 1, of which only four are shown as examples in FIG. 6. This holding device 21 is stationarily fastened on or in the housing (not shown) of the annealing device 7 so that every brush-type seal 1 held by the holding device 21 is axially aligned with the annealing arbor 8.

For holding the brush-type seals 1, the holding device 21 contains a holding ring 22 and a clamping lid 23. In order to be able to receive a plurality of axially mutually aligned brush-type seals 1, spacer parts, such as spacer rings 24, are also provided which can be inserted between the brush-type seals 1. So that the same holding device 21 can always be used for various numbers of brush-type seals 1 to be machined, different compensating rings 25, of which only one is shown in FIG. 6, can be used as compensating devices. Thus, it is possible to use the holding device 21 with only one brush-type seal 1 or, for example, with up to twenty brush-type seals 1.

After the insertion of the desired number of brush-type seals 1 and spacer rings 24 situated in-between, as well as a possibly required compensating ring 25, in the holding ring 22, the clamping lid 23 is placed on the latter and is fastened thereon via screws 26 so that each brush-type seal 1 is held in the holding device 21 in a centered and firm manner. The holding device 21 also ensures that several brush-type seals 1 fastened therein are axially aligned with one another.

So that in the course of the subsequent machining of the brush-type seals 1 in the holding device 21, particularly during the inclining of the bristles 2 of the brush-type seals 1, the latter, as a whole, cannot twist, the holding device 21 also contains a torsion protection device 27. In the embodiment illustrated in FIG. 6, this protection device 27 is formed by an adjusting spring 28 and is provided for fixing the at least one brush-type seal 1 in its position with the inclined bristles 2 particularly during the operation of the inclining of the bristles but also during the annealing treatment, relative to the annealing device 7 in the rotating direction with respect to the holding device 21 so that the setting of a desired inclination of the bristles 2 or a set inclination of the bristles 2 is ensured.

When the holding device 21 with one or several brush-type seals 1 is mounted in the housing (not shown) of the annealing device 7, the annealing arbor 8 will be adjusted by the control 18 by means of the driving devices 17 such that it is situated completely outside the holding device 21, and that the annealing wall 10 formed by its outside circumferential surface 9 in the area of the annealing cylinder 16 is at room temperature.

The control 18 will then first cause the driving devices 17 to push the annealing arbor 8 at a constant speed into the holding device 21, for the purpose of which the holding ring 22 has a suitable opening 29 whose inside diameter is slightly larger than the outside diameter C' of the annealing cylinder 16. During this axial adjustment of the annealing arbor 8, which is indicated by an arrow E in FIG. 6, the annealing arbor 8 is rotated by the driving devices 17 according to the control 18 simultaneously at a constant rotational speed about its axis 30, as indicated by the arrow D' in FIG. 6.

During the moving of the annealing arbor 8 into the holding device 21 with the brush-type seals 1 contained therein, while the annealing arbor 8 is simultaneously rotated, the annealing arbor 8 still being at room temperature, the bristles 2 of these brush-type seals 1 are tilted. In this case, the free ends 15 of the bristles 2 first come in contact with the conical exterior surface 31 of the expansion cone 13 so that, because of the advancing of the annealing arbor 8, the bristles 2 are increasingly bent in the direction of the adjustment of the latter according to arrow E in FIG. 6. Simultaneously therewith, the bristles 2 of the treated brush-type seals 1 are bent by the rotation of the annealing arbor 8 according to arrow D' in FIG. 6 in the rotating direction. Care should be taken in this case that the rotating direction of the annealing arbor 8 indicated by the arrow D' coincides with the rotation of the shaft (arrow D in FIG. 3) which later occurs during the use of the brush-type seal 1. However, if such a brush-type seal 1 is to be used on a shaft rotating in the opposite direction, it only has to be inserted in a position which is rotated by 180° about its ring diameter.

Thus, during the axial advancing of the annealing arbor 8, the bristles 2 of the brush-type seals 1 are gripped successively and are bent in an appropriate manner for the desired inclination, as demonstrated by the two central brush-type seals 1 which are illustrated in FIG. 6. In the further course of the axial advance of the annealing arbor 8, its annealing cylinder 16 will then reach the planes of the individual brush-type seals 1, which is illustrated in FIG. 6 for the lowest brush-type seal 1. The outside diameter C' of the annealing cylinder 16 or of the annealing arbor 8 in this area determines the inside diameter C of the brush-type seal 1 with the inclined bristles 2.

So that the annealing arbor 8 can be pushed sufficiently far into the holding device 21 so that the bristles 2 of all brush-type seals 1 in the holding device 21 rest on the outer circumferential surface 9 of the annealing cylinder 16, that is on the annealing wall 10, the clamping lid 23 may also be provided with a central opening 32 which makes it possible for the expansion cone 13 to pass through the holding device 21 so that, in the latter, only the annealing cylinder 16 of the annealing arbor 8 is situated opposite the bristles 2 of the brush-type seals 1.

The driving devices 17 are driven by the control 18 for the advancing of the annealing arbor 8 only until all brush-type seals 1 situated in the holding device 12 by means of the free ends 15 of their bristles 2 rest against the outer circumferential surface 9 of the annealing cylinder 16. Then the axial advance of the annealing arbor 8 will be adjusted. However, the rotary drive of the annealing arbor 8 will still be continued for a defined time period in order to ensure that all bristles 2 of the individual brush-type seals in the holding device 18 are situated within the plane defined by the respective brush-type seal 1 and are inclined in it in the desired manner with respect to the radii B of the brush-type seals 1. As a result, it is avoided that individual bristles 2 are still bent out of the planes of the brush-type seals 1 in the direction of the arrow E.

In order to exclude such a bending of the bristles 2 particularly reliably, the annealing arbor 8 can be advanced in the direction of the arrow E slightly farther than desirable for the later temperature treatment. Subsequently, as previously, the annealing arbor 8, while being simultaneously rotated, can be moved back in the direction of the arrow D', opposite to the direction of the arrow E, in order to correspondingly bend the bristles 2. In particular, it is also possible to carry out such a back-and-forth movement of the annealing arbor 8 with a decreasing amplitude about an end position of the annealing arbor 8. When the annealing arbor 8 has reached its end position in the axial direction, its axial adjustment is set and the rotation is maintained for a defined time, whereby the bristles 2 of the thus treated brush-type seals 1 are optimally situated within the plane set by the latter.

Frequently, inclination angles a of the bristles 2 of approximately 45° are endeavored. However, without limitation, by means of the present annealing device, inclinations angles between approximately 30° to approximately 60° may also be achieved. However, the achievable inclination angles a can also be implemented between approximately 15° to approximately 75° or even outside this range. The steepness of the conical shape of the expansion cone 13 can be coordinated with the inclinations of the bristles 2 to be set just like the advancing speed and rotational speed of the annealing arbor 8.

After the control 18 has completely switched off the driving devices 17, it will operate the heating devices 19 of the annealing device 7 in order to bring the exterior wall of the annealing cylinder 16 constructed as the annealing wall 10 to a temperature which is suitable for the recrystallization annealing of the bristles 2 in their inclined position. As a function of the material of the bristles, such a temperature is in particular in the range between approximately 500° C. and approximately 1,000° C. Frequently, the desired temperature will be between approximately 700° C. and approximately 800° C. For metal bristles, it was found that the temperature should be between approximately 720° C. and approximately 780° C. The reaching of the desired temperature is detected by the control 18 by means of temperature monitoring devices 20, such as temperature sensors. By analyzing the temperature information from the temperature monitoring devices 20, the control 18 will then maintain the annealing wall 10 at the desired and preferably adjustable temperature in that it correspondingly operates heating device 19.

The recrystallization temperature will then be maintained by the control 18 for, for example, one hour. As a function of the material but also of the geometries and positions of the bristles, a time period of from approximately 45 minutes to approximately 75 minutes may also be provided for keeping the temperature of the annealing wall 10 constant. Even shorter time periods, such as approximately 30 minutes, or even longer time periods, such as approximately 90 minutes, may also be sufficient or required without any limitation.

After the recrystallization annealing of the bristles 2 has been concluded, the control 18 will optionally cause a defined cooling of the bristles 2.

The bristles 2 of the treated brush-type seals 1, which are therefore present in their required inclination, can finally, for the purpose of a finishing of the functional diameter of the brush or of the bristles 2 with respect to their lengths or shapes on the free ends 15 be fed to finishing devices (not shown). It was found advantageous to use a water torch (not shown) for this purpose, in which case the brush-type seals 1 may remain in the holding device 21 or be removed from it.

In the case of the process for manufacturing ring-shaped brush-type seals 1 with inclined bristles 2, which was also described above in sections in conjunction with the operation of the annealing device 1, basically only the following steps are important.

First, at least one ring-shaped brush-type seal 1 with radially extending bristles 2 of such a length must be provided which, by inclining the bristles 2 with respect to the radii B of the ring-shaped brush-type seal 1, leads at least essentially to the desired brush diameter C. Then, the at least one brush-type seal 1 and at least the heatable annealing wall 10 of the annealing device 7 are positioned relative to one another such that the free bristle ends 15, while the bristles 2 are bent, rest against the annealing wall 10. Simultaneously or subsequently, a rotating of the at least one brush-type seal 1 and at least of the heatable annealing wall 10 relative to one another takes place until the bristles 2 are inclined with respect to the radii B of the ring-shaped brush-type seal 1 in its ring plane, by a definable angle a. When this condition of the brush-type seal(s) 1 has been reached, the annealing wall 10 is heated to a definable temperature which is maintained for a defined time period. Subsequently, the at least one brush-type seal 1 may be moved from the annealing device 7.

The implementation of the invention is limited neither with respect to the process nor to the arrangement to circular-ring-shaped brush-type seals made of metal, although the predominant number of applications can be seen here. Also, the invention is not only aimed at the machining of interior brushes. By means of the above-described arrangement and the process which can be carried out by means of it, brush-type seals with exterior brushes or interior and exterior brushes in each case with inclined bristles can also be produced. In particular, it is also not important whether, during the adjusting operation of the brush-type seal and the annealing device or parts thereof relative to or against one another, the brush-type seal and/or the annealing device or parts thereof are moved.

What is claimed is:

1. Arrangement for manufacturing ring-shaped brush seals with inclined bristles, comprising:
   an annealing device with at least a heatable annealing wall which, together with at least one ring-shaped brush seal with radially extending bristles is positioned relative to one another such that free bristle ends, while the bristles are bent, rest on the heatable annealing wall of the annealing device, and wherein the annealing device and the at least one brush seal are rotated simultaneously with the positioning or subsequently to the positioning relative to one another such that the bristles are inclined with respect to the radii of the ring-shaped brush seal in its plane by a definable angle.

2. Arrangement according to claim 1, wherein the heatable annealing wall is an exterior wall of an annealing arbor on which the at least one ring-shaped brush seal can be placed.

3. Arrangement for manufacturing ring-shaped brush seals with inclined bristles according to claim 2, wherein the annealing arbor is substantially cylindrical and has a conical expansion cone in its free end area which is designed for the fitting-on of the at least one ring-shaped brush seal and is situated opposite its mounting end in the annealing device, the outside diameter of the expansion cone increasing from the free end of the annealing arbor in the direction of its mounting end in the annealing device, the maximal outside diameter of the annealing arbor corresponding at least substantially to the inside diameter of the ring-shaped brush seal with the inclined bristles to be finished.

4. Arrangement according to claim 1, wherein the annealing device contains a holding device for holding the at least one brush seal.

5. Arrangement according to claim 4, wherein the holding device, for receiving a plurality of axially mutually alignable brush seals, contains spacer parts which are insertable between the latter.

6. Arrangement according to claim 1, wherein the annealing device contains controllable driving devices designed for adjusting the at least one brush seal and the heatable annealing wall of the annealing device relative to one another in order to position the at least one brush seal and the heatable annealing wall of the annealing device relative to one another and/or in order to rotate the at least one brush seal and at least the heatable annealing wall relative to one another, until the bristles are inclined with respect to the radii of the ring-shaped brush seal in its plane by a definable angle (a), and wherein the driving devices are designed for adjusting the heatable annealing wall as well as for an adjusting with a constant advance and/or a constant rotational speed.

7. Arrangement according to claim 1, wherein the annealing device contains controllable heating devices by which at least the heatable annealing wall of the annealing device is heated to a temperature between approximately 500° C. and approximately 1,000° C.

8. Arrangement for manufacturing ring-shaped brush seals having inclined bristles according to claim 1, wherein the annealing device contains a control which controls the heating of the heatable annealing wall and the maintaining of the desired temperature in this case for a time period of approximately 30 minutes to approximately 90 minutes.

9. Arrangement according to claim 8, wherein the control also controls a cooling operation of the heatable annealing wall of the annealing device.

10. Arrangement according to claim 1, wherein finishing devices are provided for finishing the functional diameter of the brush of the at least one brush seal after the annealing treatment.

11. Arrangement for manufacturing ring-shaped brush seals having inclined bristles according to claim 1, wherein a torsion protection device is provided which holds the at least one brush seal in its position with the inclined bristles relative to the annealing device, the protection device, on the one side, being applied to one of the annealing device, the at least one brush seal, and the holding device and, on the other side, being applied to the at least one brush seal or the annealing device.

12. Arrangement according to claim 5, wherein the spacer parts are spacer rings.

* * * * *